United States Patent

[11] 3,583,792

[72] Inventors Derek Jones
Sunnyvale, Calif.;
William F. Flockhart, Camberley, England;
Andre Jean Guyon, Binghamton, N.Y.
[21] Appl. No. 721,858
[22] Filed Apr. 16, 1968
[45] Patented June 8, 1971
[73] Assignee Singer-General Precision, Inc.
Binghamton, N.Y.

[54] MICROLINEAR MOTION CONTROL
3 Claims, 1 Drawing Fig.
[52] U.S. Cl. ........................................... 350/255,
350/43
[51] Int. Cl. ........................................... G02b 7/02
[50] Field of Search .............................. 267/252,
151; 350/252—255, 245, 247, 110—116, 40, 41,
44, 46, 47, 84, 74, 287, 67, 76

[56] References Cited
UNITED STATES PATENTS
| 1,912,451 | 6/1933 | Hibbard | 267/152X |
| 3,474,992 | 10/1969 | Schuck et al. | 267/152X |
| 461,389 | 10/1891 | Paoli | 350/46X |
| 535,862 | 3/1895 | Sawyer | 350/77 |
| 2,299,997 | 10/1942 | Ladrach | 33/148-H |

OTHER REFERENCES
" Engineering Mechanics, Statics and Dynamics", by Pletta and Federick, The Ronald Press Co., New York, 1964. Page 597

*Primary Examiner*—David Schonberg
*Assistant Examiner*—Michael J. Tokar
*Attorneys*—Francis L. Masselle, William Grobman and Andrew G. Pullos ABSTRACT: An apparatus is disclosed for linearly displacing an optical lens along the optical axis thereof. The apparatus is formed of a pair of resilient diaphragms secured between the lens and a reference frame in spaced, parallel relationship to one another and in orthogonal relationship to the optical axis. A compression spring is disposed for producing a force acting in a direction and along a line which is coincident with the optical axis of the lens. A control device, the displacement of which can be accurately determined, is disposed for applying a force to one end of the spring. The spring constant of one or both of the diaphragms is of greater value than the value of the spring constant of the compression spring so that a relatively large displacement of the control device within the compression range of the spring will produce a relatively small displacement of the optical lens. The lens, therefore, can be accurately positioned, and the resulting displacement of the lens can be accurately determined by measuring the displacement of the control device.

PATENTED JUN 8 1971
3,583,792
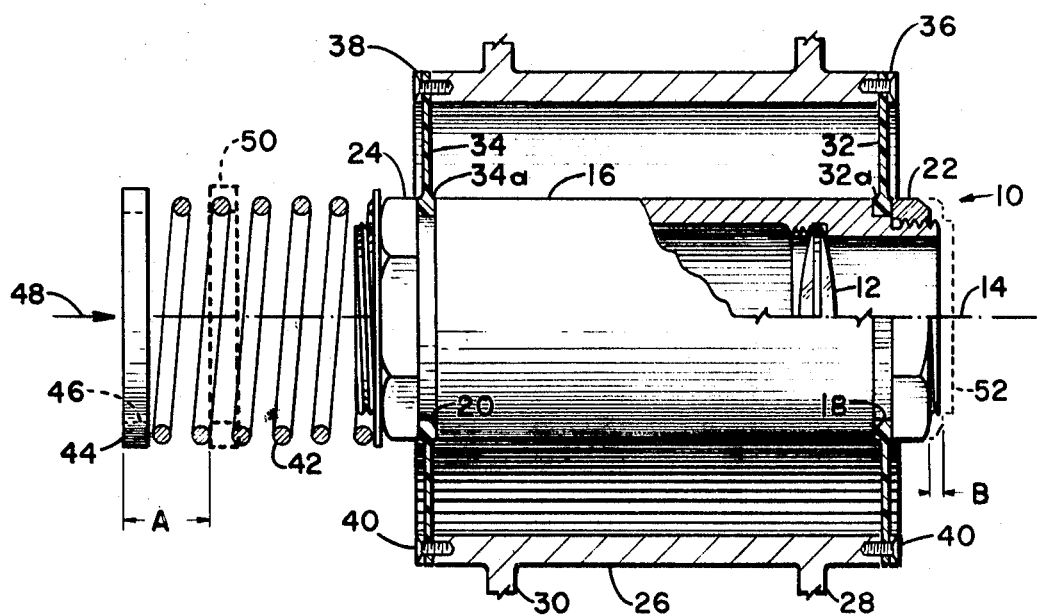
ANDRE J. GUYON
DEREK JONES
WILLIAM F. FLOCKHART
INVENTORS
BY Francis L. Masselle
ATTORNEY

MICROLINEAR MOTION CONTROL

This invention relates generally to an apparatus for displacing an element relatively small distances, and more particularly to such an apparatus which imparts linear movement to an element over a relatively small distance in response to movement of a control device over a relatively large distance. The present invention has particular application in the positioning of an optical lens or lens system along the optical axis thereof for focusing a composite optical system, but may be employed in any system wherein an element is to be accurately positioned by linear displacement thereof over a relatively small distance, and in which such a displacement can be accurately determined from the displacement of a control device over a relatively large distance.

Devices capable of accurately positioning an element have applications in many fields. For instance, such devices may be employed in precision measuring instruments, machine tool control, and positioning of components wherein motions of the order of a microinch or less are desirable.

A large variety of mechanisms are presently available which are capable of positioning an element with some degree of accuracy. The most basic types of such devices employ mechanisms, such as differential screws, gears, levers, Bourdon tubes, etc. for displacing an element a relatively small distance in response to a control function.

However, in each of the devices known in the prior art for accurately positioning an element, limitations are inherent in the structure of such devices which reduce their capabilities. One of the limitations of the prior known structures is undesirable backlash which exists by virtue of the engagement of two parts of the mechanism with one another in opposite directions of travel. Such backlash does not permit accurate positioning of the element in both directions of travel and, consequently, reduces the resolution of the entire system. Another limitation which is inherent in the structures of many of the prior known devices is that of the elasticity of those parts of the mechanism which are intended to be rigid and which contribute to producing motion of the controlled element. This limitation of such mechanisms also decreases the resolution thereof, particularly when the forces applied to the controlled device by the mechanism are not constant.

Another limitation which is inherent in the structure of many of the prior known mechanisms is the existence of friction between those components which move relative to one another. Such inherent friction in these mechanisms also decreases the resolution.

Of the devices presently known for accurately positioning an element in response to a control function, a majority of such devices are of a physical size which is entirely out of proportion to the element being positioned. In many applications of such mechanisms, the element to be positioned forms part of a system wherein the spacing between the controlled element and the other components of the system is restricted. In other applications of such a positioning mechanism, the particular shape and size of the mechanism may interfere with the operation of the system which incorporates the controlled element. For instance, in the positioning of an optical lens, the positioning mechanism cannot interfere with the transmission of light through the optical system. In addition, the spacing between optical lenses is often restricted, and, consequently, limitations are imposed on the size of the positioning mechanism.

Another problem which is encountered by many of the prior known positioning mechanisms is that of maintaining linear direction in the motion of the controlled element. It is not only essential in many applications of such positioning mechanisms that the travel of the controlled element maintain the same direction, but that the travel of the controlled element follow a straight line. Although many of the prior known mechanisms can generally achieve a linear direction of motion, many of such mechanisms produce slight transverse motions in the controlled element, which motions are commonly referred to as "play." These conditions which exist with respect to the linear direction of motion and the "play" of the controlled element impose severe limitations on any composite system which incorporates the element therein. In many applications, these limitations cannot be tolerated. This is often the case in the use of positioning mechanisms in optical systems wherein an optical lens is to be positioned along the optical axis thereof for purposes of focusing the optical system.

In order to increase the resolution of many of the know positioning mechanisms and to achieve a more linear direction of the travel and reduce the "play" in the travel of the element, additional mechanisms are required. As a result, the positioning mechanism becomes extremely complicated, expensive, and of a relatively large size.

In order to obtain a high degree of accuracy in the positioning of an element, a large velocity ratio must be employed. The velocity ratio of a positioning mechanism is defined as the ratio of the displacement of the control device to the displacement of the controlled element. However, in many of the prior known positioning mechanisms, it is often necessary to reduce the velocity ratio in order to increase one of the other characteristics of the mechanism, such as providing a more linear direction of travel to the element to be positioned.

A serious problem encountered by many of the known positioning mechanisms is that of the vibrations caused by the interaction between the parts thereof with the controlled element. This limitation is extremely serious in the application of such positioning mechanisms in optical systems.

It is, therefore, an object of the present invention to provide an apparatus for accurately positioning an element, which apparatus is completely void of any backlash such that any movement of a control device is reflected by a proportional amount of movement of the element to be positioned without any lost motion.

It is another object of the present invention to provide an apparatus for positioning an element, which apparatus employs a minimum number of rigid components which contribute to producing motion of the controlled element such that the elasticity of those components will be negligible in determining the position of the controlled element.

It is still another object of the present invention to provide an apparatus for accurately positioning an element, which apparatus is formed of components which have no frictional cooperation with one another in order to produce movement of the controlled element.

It is still a further object of the present invention to provide an apparatus for accurately positioning an element, which apparatus is of relatively small physical size such that it is capable of being mounted within a system, such as an optical system, without interfering with the operation thereof.

Still another object of the present invention is to provide an apparatus for accurately positioning an element which is of extremely simple configuration and design to the extent that the apparatus is extremely reliable and not susceptible of fatigue or failure.

Still a further object of the present invention is to provide an apparatus for accurately positioning an element, which apparatus is capable of maintaining linear direction in the motion of the element to be positioned.

And still another object of the present invention is to provide an apparatus for accurately positioning an element, which apparatus is capable of producing linear direction in the motion of the element to be positioned without the occurrence of any transverse motions, commonly referred to as "play."

A still further object of the present invention is to provide an apparatus for accurately positioning an element which is capable of providing a large velocity ratio without losing any of the other characteristics which are advantageous to the successful operation thereof, such as those advantageous characteristics mentioned hereinbefore.

Another object of the present invention is to provide an apparatus for accurately positioning an element, which apparatus is capable of isolating vibrational forces from the controlled element.

These and other objects and advantages are attained by the present invention which is generally formed of first resilient means secured between the controlled element and a reference frame which permits movement of the element along a line of displacement thereof and second resilient means disposed for engaging the element and for imparting a force thereto along the line of displacement thereof.

A feature of the present invention resides in a provision of a resilient diaphragm secured between the frame and the element and a spring positioned between a control device and the element such that the element is isolated from any vibrational forces which may be imparted to and transmitted through either the control device or the reference frame.

Another feature that the present invention resides in the provision of a second diaphragm secured between the reference frame and the controlled element and spaced from the first diaphragm. The pair of diaphragms forms a transmission and guide arrangement for the controlled element which provides linearity of travel without any play in the motion of the element.

Still another feature of the present invention resides in the selection of a larger spring constant of the diaphragms than the spring constant of the compression spring, such that a large velocity ratio is attained.

A still further feature of the present invention resides in the proper selection of the correct spring constants for the spring and the diaphragms so as to provide isolation of any vibrational forces from the controlled element.

These and other objects, features and advantages of the present invention will be more fully realized and understood from the following detailed description when taken in conjunction with the accompanying drawing wherein the single FIGURE therein is a view in elevation, partly in the section and partially broken away, of the preferred embodiment of the present invention.

With reference to the drawing in detail, there is shown the preferred embodiment of the present invention and an element, generally designated with the reference numeral 10, which is to be positioned thereby. The element 10 is illustrated as being a component of an optical system which is to be positioned therein for purposes of focusing. It is to be understood, however, that the controlled element may take other forms, such as a machine tool, a precision measuring instrument, or a component to be positioned wherein motions of the order of a microinch or less are desirable.

The element 10 is illustrated in the drawing as being formed of a lens 12 having the optical axis thereof coincident with a reference line designated with the reference numeral 14. In the disclosed application of the present invention, the reference line 14 will also be coincident with the optical axis of the system incorporating the element 10. The lens 12 is rigidly mounted in the bore of a barrel 16. Light rays which pass the bore of the barrel 16 are transmitted through the lens 12 and altered according to the properties thereof. Each end of the barrel 16 includes a reduced portion, which portions form a pair of shoulders 18 and 20. The extreme ends of the barrel 16 are threaded and are disposed for receiving a pair of nuts 22 and 24 thereon.

A reference frame 26 is illustrated as being formed of a hollow cylindrical member surrounding the element 10 and disposed for stationary mounting with respect to the optical system which includes as one component thereof the element 10. In the illustrated embodiment of the invention, the reference frame 26 includes a pair of flanges 28 and 30 for mounting the same with respect to the optical system. However, it is to be understood that the reference frame 26 may be extended longitudinally to form the mounting structure for the entire optical system.

A pair of circular diaphragms 32 and 34, which may be formed of any material having the desired spring constant, each include an enlarged circumferential portion 32a and 34a, respectively, at an inner periphery thereof. The enlarged portions 32a and 34a are disposed for being tightly secured on the reduced portions of the barrel 16 between the shoulder 18 and the nut 22 and between the shoulder 20 and the nut 24 respectively. An outer periphery of each of the diaphragms 32 and 34 is secured to a respective end of the reference frame 26 by means of respective retaining ring 36 and 38 and a plurality of bolt 40.

A compression spring 42 is mounted between one end of the controlled element 10 and a ring 44 which forms a part of the control device. The ring 44 is formed with an aperture 46 therein through which light rays pass to impinge upon the lens 12. The ring 44 is disposed for being moved or displaced along the reference line 14 by a force produced by the control device which is represented by an arrow designated with the reference numeral 48.

When a force, such as that represented by the arrow 48, is imparted to the ring 44 to displace the ring 44 a distance A to the position indicated by the dotted lines designated with the reference number 50, the element 10 will be displaced a distance B as indicated by the dotted line designated with the reference numeral 52. The ratio of A to B is the velocity ratio of the positioning mechanism. This velocity ratio is a function of the spring constants of the compression spring 42 and the diaphragms 32 and 34. By proper selection of these spring constants not only can a large velocity ratio be obtained but vibrational forces can be isolated from the element 10.

It is to be understood, of course, that the diaphragms 32 and 34 need not be necessarily circular. In addition, it is to be understood that the reference frame 26 need not be of a cylindrical form, but may take any form which will support by means of a resilient structure the element 10 along the optical axis thereof during movement of the element 10.

The invention we claim is:
1. A microlinear positioning apparatus comprising,
   a. a stationary base;
   b. an optical element supported for linear movement along a fixed axis with respect to said base;
      a. first resilient means having a first spring constant and affixed to said optical element to provide yielding support thereto upon said base;
      b. a movable positioning device; and
      c. second resilient means having a second spring constant, significantly smaller than said first spring constant, arranged between said positioning device and said optical element to transmit to said optical element a force along said axis commensurate with the relationship between displacement of said positioning device and said second spring constant, said optical element thereby being displaced along said axis a distance commensurate with the relationship between said force and said first spring constant.
2. An apparatus as defined in claim 1, wherein said first resilient means includes a first diaphragm secured to the said base at an outer periphery thereof, said optical element being secured to a central portion of said first diaphragm.
3. An apparatus as defined in claim 2, wherein said first diaphragm is secured to one end of said optical element, and wherein said first resilient means further includes a second diaphragm secured to said base at an outer periphery thereof and to the other end of said element at a central portion thereof.